July 1, 1930. S. J. LONERGAN 1,769,300
CASING OR JACKET AND PROCESS OF MAKING SAME
Filed July 27, 1926 6 Sheets-Sheet 1

Inventor.
Simon J. Lonergan
by
atty

July 1, 1930.  S. J. LONERGAN  1,769,300
CASING OR JACKET AND PROCESS OF MAKING SAME
Filed July 27, 1926   6 Sheets-Sheet 2

Inventor:
Simon J. Lonergan
by Geo. A. Pitts
Atty

July 1, 1930. S. J. LONERGAN 1,769,300
CASING OR JACKET AND PROCESS OF MAKING SAME
Filed July 27, 1926 6 Sheets-Sheet 4

Inventor:
Simon J. Lonergan
by Fro A. Atts
Atty

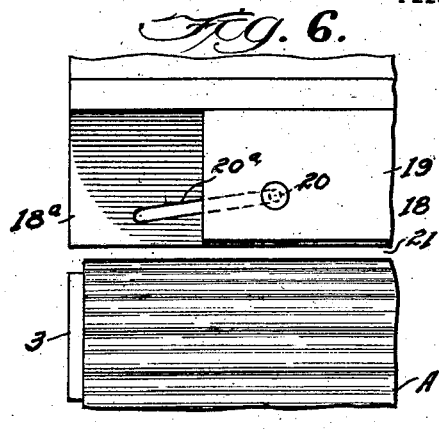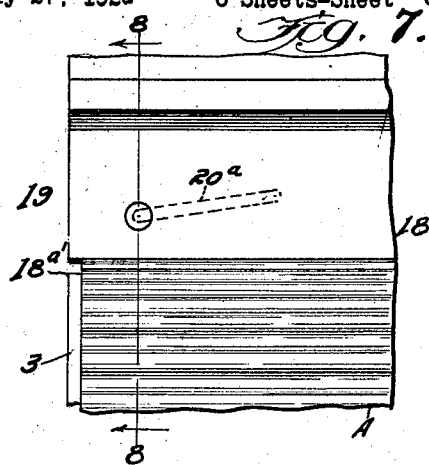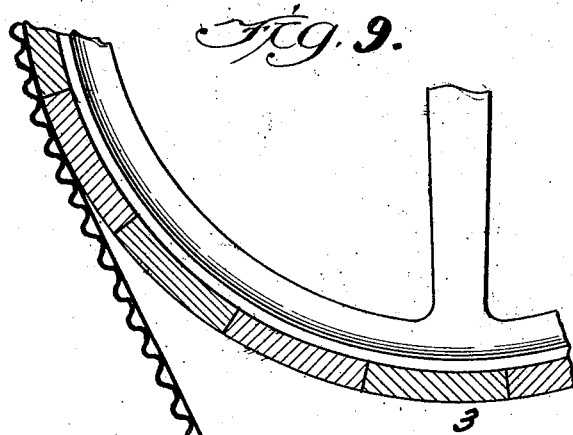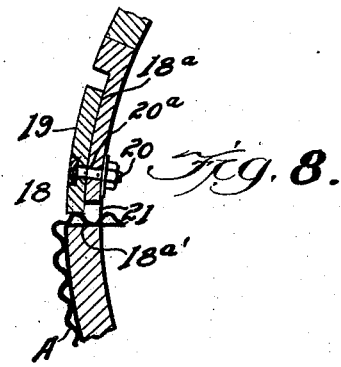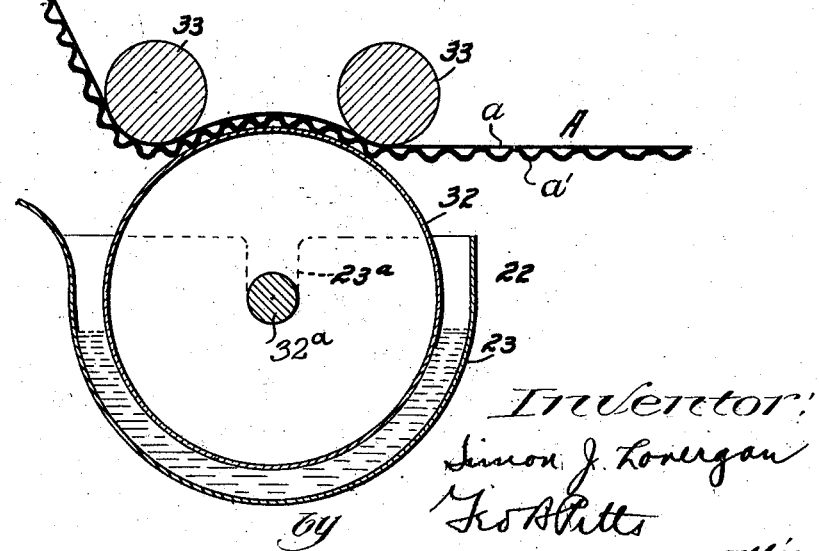

July 1, 1930.　　　　S. J. LONERGAN　　　　1,769,300
CASING OR JACKET AND PROCESS OF MAKING SAME
Filed July 27, 1926　　6 Sheets-Sheet 6
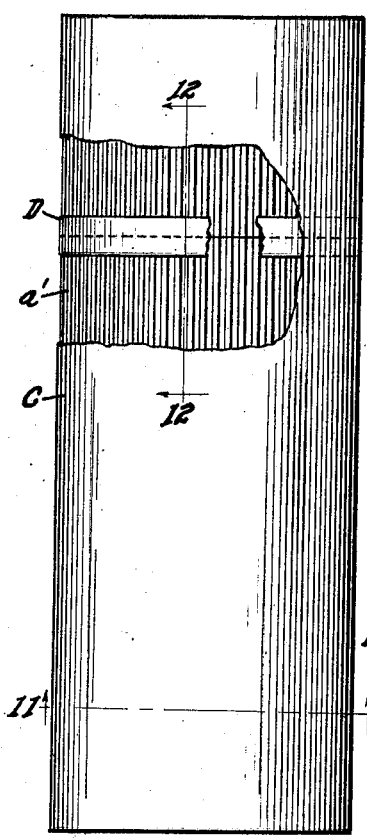
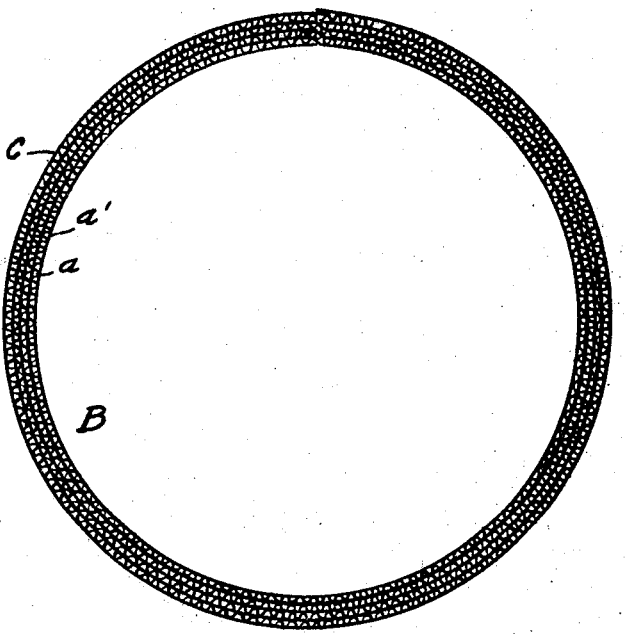
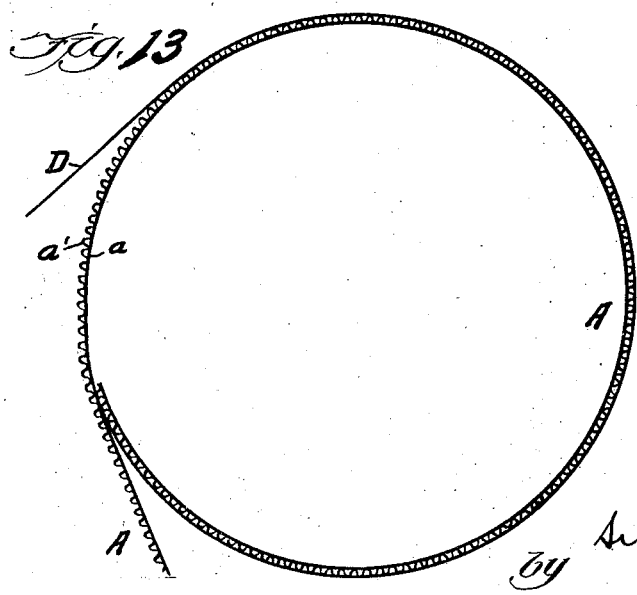
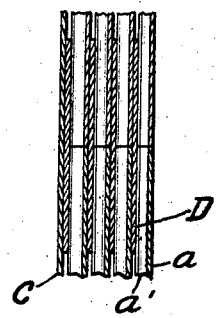
Inventor:
Simon J. Lonergan
by Geo. A. Pitts
Atty Patented July 1, 1930

1,769,300

UNITED STATES PATENT OFFICE

SIMON J. LONERGAN, OF LA PORTE, INDIANA, ASSIGNOR TO BASTIAN-MORLEY CO., OF LA PORTE, INDIANA, A CORPORATION OF INDIANA

CASING OR JACKET AND PROCESS OF MAKING SAME

Application filed July 27, 1926. Serial No. 125,272.

This invention relates to a process of making casings or jackets, more particularly of the cylindrical or tubular type, and also to the product resulting therefrom. In carrying out my invention, I may use a composite web of asbestos material, preferably of cellular form, whereby danger of fire or burning is eliminated and loss of heat is prevented.

One object of the invention is to provide an improved process of making casings or jackets to facilitate the complete manufacture thereof.

Another object of the invention is to provide an improved process of making casings or jackets of varying lengths irrespective of the widths of the stock or web obtainable.

Another object of the invention is to provide an improved process of winding casings or jackets in a ready and economical manner.

A further object of the invention is to provide an improved process of winding a composite web of asbestos material having a cellular portion, without affecting the cells or spaces thereof, with the result that the walls of the product comprise substantially annular rows of air spaces, the walls of which are re-inforced by sheet stock material interposed between the rows.

Other objects of the invention will be apparent to those skilled in the art to which my invention relates from the following description taken in connection with the accompanying drawings, wherein Fig. 1 is a front elevation of a machine capable of use in carrying out my improved process.

Fig. 6 is a fragmentary plan view of a portion of the mandrel, showing the clamping member in unlocking or unclamping position.

Fig. 7 is a view similar to Fig. 6 but showing the clamping member in position to clamp the transverse or free edge of the web to the mandrel.

Fig. 8 is a section on the line 8—8 of Fig. 7.

Fig. 9 is a fragmentary view of parts shown in Fig. 4, enlarged.

Fig. 10 is an elevation of a casing or jacket made on the machine herein illustrated and according to my improved process, parts being broken away to facilitate the illustration.

Fig. 11 is a section on the line 11—11 of Fig. 10, enlarged.

Fig. 12 is a section on the line 12—12 of Fig. 10, enlarged.

Fig. 13 is a view, somewhat diagrammatic, showing the manner of winding the composite web and connecting strip on the mandrel.

Figure 1:
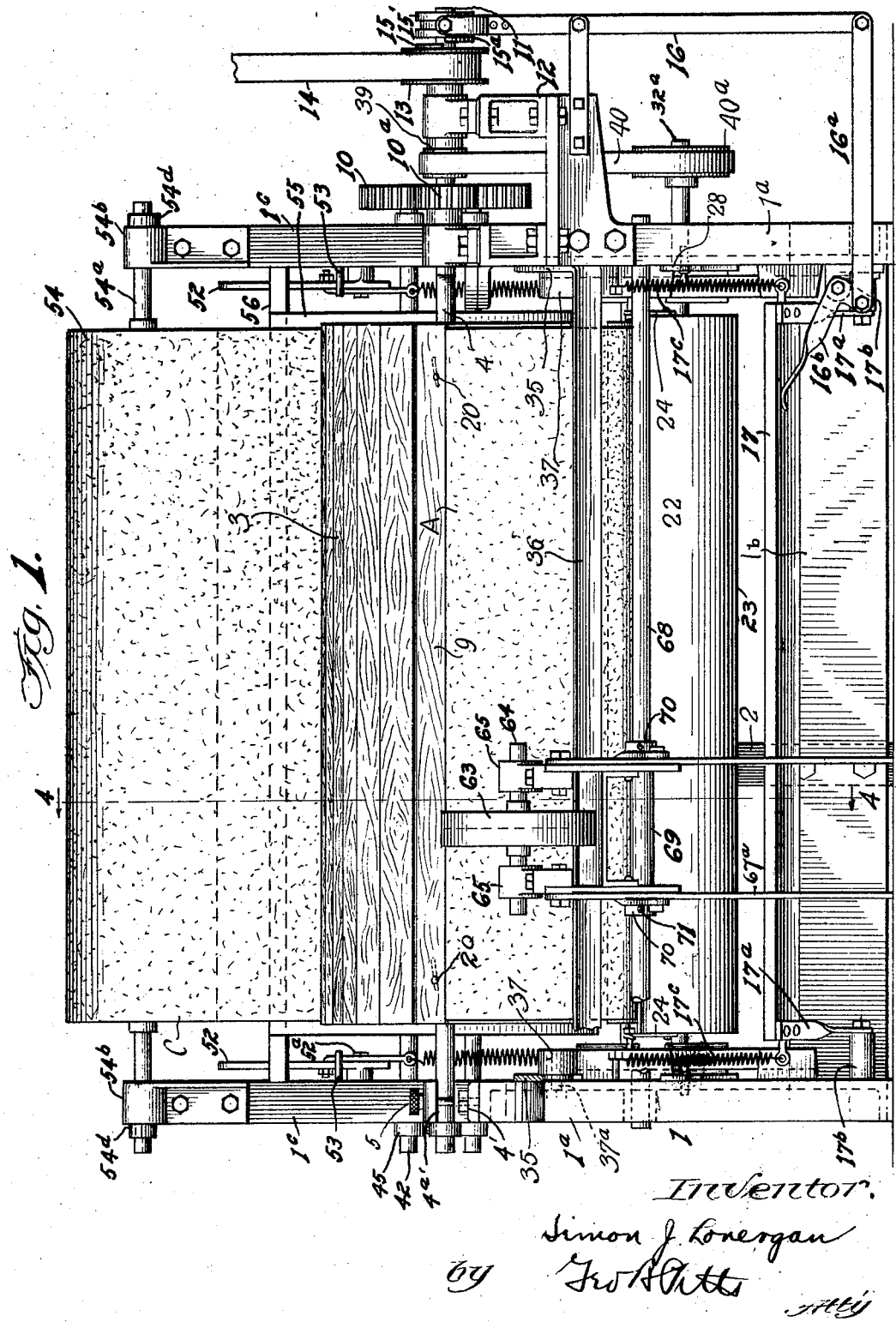

In the drawings, 1 indicates a suitable frame, preferably comprising upright side members $1^a$, $1^a$, connected by a transverse member $1^b$ and separate members 2, preferably connected to the side members by lower connectors $2^a$ and an upper connector $2^b$.

3 indicates a mandrel or drum on which a web of suitable material, indicated at A, is wound to form a casing or jacket B. In my application of the invention, I have adapted the casings or jackets made upon the machine herein illustrated and according to my improved process to containers or tanks the side walls of which are round, for which reason the mandrel 3 herein shown for illustrative purposes is round and of a predetermined size so that the casings or jackets will snugly fit the outer walls of the containers or tanks, but it will be understood that the mandrel may be variously shaped to fit walls having other cross-sectional shapes, and furthermore the mandrel may be of any desired size, being removably mounted on the frame 1 as will later appear. The web A is preferably of composite form and comprises suitable material dependent upon the use to be made of the casings or jackets. Where the casings or jackets are to be used to cover or enclose piping, manifolds, containers or tanks, to prevent temperature changes of the medium contained therein, for example a water tank associated with or containing a heating means, I use a composite web comprising a sheet of asbestos cloth $a$ and a corrugated sheet of the same material, indicated at a', in contiguous relation to one surface of the sheet a, with the corrugations extending transversely of the latter. The corrugated sheet a', or rather the corrugations thereof, are secured to the sheet a in any desired manner, to form a unitary, composite web and so that both may be fed as a unitary structure to the mandrel 3 and wound thereon without wrinkling or distortion.

Figure 2:
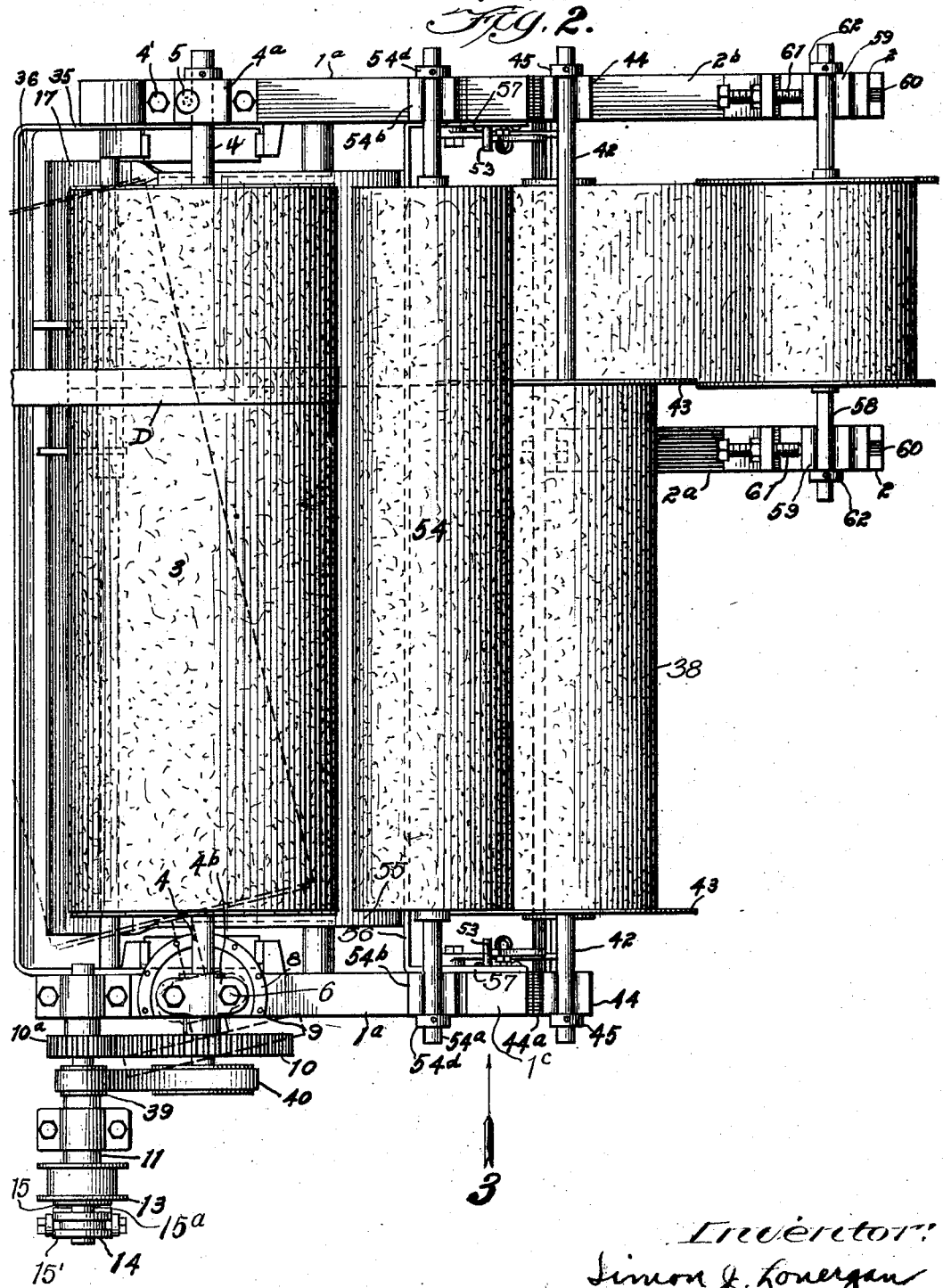
Fig. 2 is a top plan view of the machine.

The mandrel 3 is fixed to a shaft 4, the opposite ends of which are mounted in suitable bearings $4^a$, $4^b$, carried by the frame members $1^a$. The bearing $4^a$ is preferably provided in a standard which is fixed to the adjacent frame member $1^a$ by cap screws 4' and is formed at one side with a slot $4^{a\prime}$ into and through which the adjacent end of the shaft 4 is moved to position it in the bearing (the inner portion of the slot and its end wall forming the bearing for the shaft) or to remove it therefrom. The end of the shaft 4 may be locked in position in its bearing by a pin 5 bridging the slot $4^{a\prime}$ and removably fitting aligned openings formed in the walls of the standard. The bearing $4^b$ comprises upper and lower elements having suitable recesses co-operating to receive the adjacent end of the shaft 4 and held together by cap screws 6, the lower bearing element being rotatably mounted on a plate 7, preferably formed integrally with the adjacent frame member $1^a$ (see Fig. 3) and guided and held in position by an arcuate member 8 overhanging the arcuate edge of the lower bearing element. The member 8 is preferably secured to the plate 7 by screws 9. By means of this construction, the shaft 4 and mandrel 3, after the removal of the pin 5 may be swung to the position indicated by dotted lines in Fig. 2, the purpose being to so position the mandrel that the casing or jacket wound thereon may be moved endwise and removed from the mandrel, when it is completed. The shaft 4 is preferably driven by suitable power means, the means herein illustrated for this purpose comprising a gear 10 fixed to the extended end of the shaft 4 adjacent the bearing $4^b$, a pinion $10^a$ fixed to a drive shaft 11, which is mounted in suitable bearings carried by the adjacent frame member $1^a$ and a standard 12, and meshing with the gear 10. At its outer end the shaft 11 loosely supports a pulley 13 for a belt 14, and the pulley 13 is provided with clutch jaws 15 adapted to be engaged by the clutch jaws $15^a$ on a clutch element 15' splined on the shaft 11 and operatively connected through links 16, $16^a$, $16^b$, to a foot pedal 17. The pedal 17 preferably extends across the front of the machine so that the operative can readily operate the same at various positions. The pedal 17 is supported at its opposite ends by arms $17^a$, pivoted in any desired manner to bosses $17^b$.

The pedal is normally maintained in elevated position by springs $17^c$, connected at corresponding ends to the pedal 17 and to some stationary portion of the frame. When in this position, the clutch jaws 15, $15^a$, are disengaged, as shown in Fig. 1. By pressing downwardly on the pedal, the clutch jaws will be moved into engagement and thus transmit the power of the pulley 13 through the shaft 11, pinion $10^a$ and gear 10 to the shaft 4, to drive the latter. It will be noted that the driving elements for the shaft 4 are so related that the gear 10 is free to disengage the pinion $10^a$ to permit the gear to swing to the position shown in dotted lines in Fig. 2, and when the shaft 4 is moved back to operative position, the gears 10, $10^a$, are again in mesh.

The mandrel 3 may comprise a pair of wheels spaced on and secured in a well known manner to the shaft 4 and wooden sections mounted on and surrounding the wheels to form a continuous cylindrical surface.

18 indicates as an entirety means for detachably connecting the free edge of the web A to the mandrel 3, in starting to wind a casing or jacket thereon. Of these means, $18^a$ indicates a cut-away portion or recess formed in the outer surface or wall of the drum or mandrel 3. 19 indicates a clamping member, preferably extending longitudinally from end to end of the mandrel and movably mounted in the recess $18^a$, so as to move toward and from one longitudinal side wall, indicated at $18^{a\prime}$, of the recess $18^a$; this form of construction permitting the clamping member to be mounted on the outer surface of the drum without breaking the continuity of the drum surface, except for a relatively small space required for the movement of the clamping member toward and from the clamping wall $18^{a\prime}$. The clamping member is preferably slidably connected to the bottom wall of the recess $18^a$, the connections therefor comprising countersunk bolts 20 extending through elongated slots $20^a$ formed in the bottom wall of the recess $18^a$. The slots $20^a$ are slightly inclined to the axis of the mandrel 3, so that their walls may serve as cams to move the clamping member 19 toward and from the wall $18^{a\prime}$, a plurality of slots $20^a$ and connecting bolts extending therethrough being provided in spaced relation between the side edges of the mandrel 3. When the clamping member 19 is moved toward the right as viewed in Figs. 1 and 6, its clamping edge is moved away from the clamping wall $18^{a\prime}$, then the free or transverse edge of the web A is laid over this latter wall (see Figs. 6 and 8), and then the clamping member 19 is moved toward the left, to the position shown in Figs. 7 and 8, thus clamping the web A to the mandrel. If desired, the mandrel 3 may be formed with a longitudinal slot 21, adjacent the wall $18^{a\prime}$, through which the free edge of the web A may extend as shown in Fig. 8, thereby facilitating the operation of positioning the web over the wall 18$^{a'}$. Upon the completion of a casing or jacket B, the clamping member 19 is moved toward the right to release the inner free edge of the web, by a thrust movement, preferably applied to its exposed end at the left of the mandrel 3. The operation of clamping and unclamping the free edge of the web A is readily accomplished, since the material is readily flexed over the clamping wall 18$^{a'}$ and the camming action of the clamping member 19 prevents its disengagement from the web A incident to the winding operation. Since the clamping member 19 is movable at substantially right angles to the direction in which winding takes place, the clamping action of the clamping member 19 is effective to secure the web to the mandrel without its being clamped in a relatively tight manner, so that the unclamping action may be readily accomplished without the application of very much force.

Figure 3:
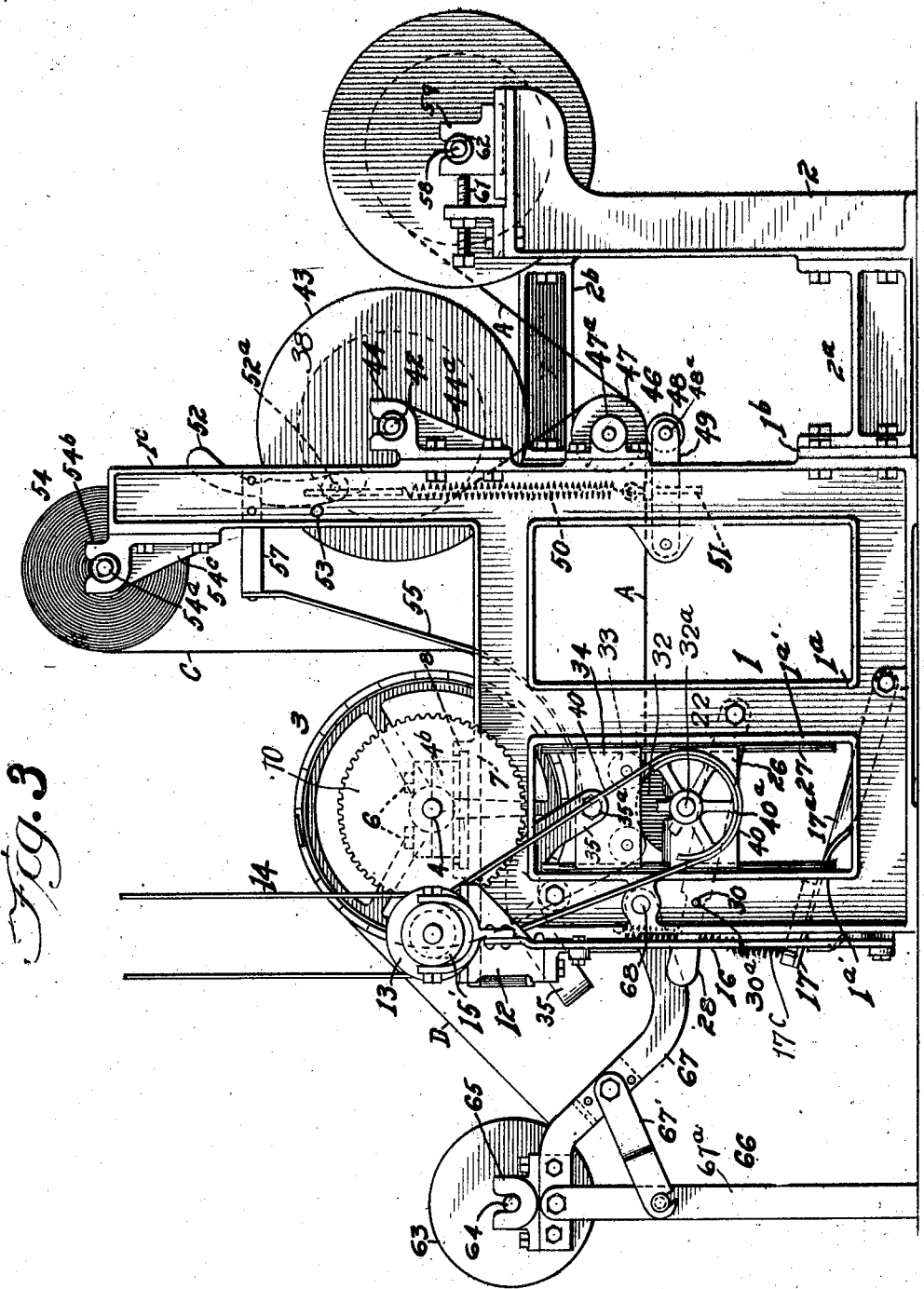
Fig. 3 is a side elevation of the machine.
Figure 4:
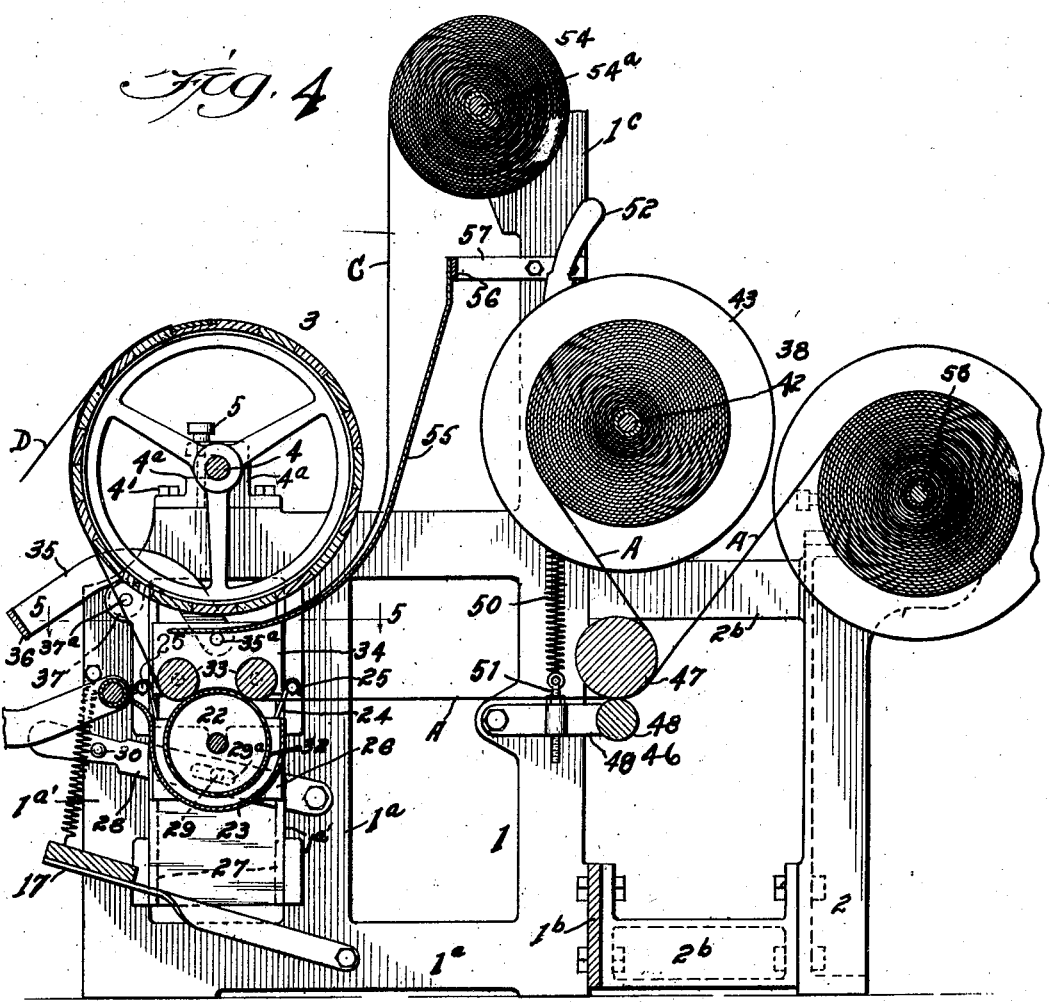
Fig. 4 is a section on the line 4—4 of Fig. 1.
Figure 5:
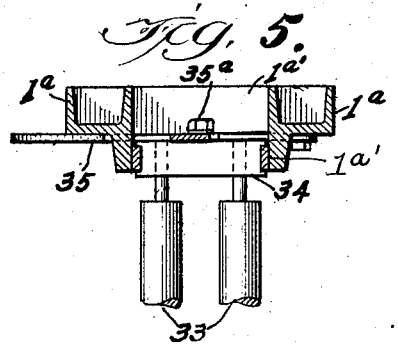
Fig. 5 is a fragmentary view on the line 5—5 of Fig. 4.

22 indicates as an entirety means for applying a suitable liquid to one surface of the web A, for example, a suitable adhesive material or glue. Of the liquid applying means 22, 23 indicates a tank for holding a supply of the material, preferably of substantially semi-circular form in cross section. At its opposite ends the tank 23 is provided with pairs of pivoted hooks 24 which removably engage suitable pins 25 carried by and extending inwardly from the frame members 1$^a$. The end walls of the tank 23 are also provided with shoes 26 which slidably engage guides 27, formed by the opposing walls 1$^{a'}$ of the frame members 1$^a$, so that upon the disconnection of the hooks 24, the tank 23 may be lowered to a position whereby filling thereof is facilitated. 28 indicates a pair of levers pivoted on the frame members 1$^a$ and having a slidable, pivotal connection with the end walls of the tank 23 and arranged to raise and lower the latter. The connection between each lever 28 and the adjacent end wall of the tank 23 may consist of a pin 29 projecting laterally from the end wall of the tank and an elongated slot 29$^a$ formed in the lever 28. The lever 28 is held in its raised position by a pin 30 removably fitting and extending through openings formed in the lever 28 and adjacent frame member 1$^a$, the latter opening being indicated at 30$^a$ in Fig. 3. 32 indicates an applying device for the liquid in the form of a roller the shaft of which is loosely mounted at its opposite ends in openings or recesses 23$^a$ formed in the end walls of the tank 23 and so arranged that a portion of the roller is submerged in the liquid in the tank 23, as shown in Fig. 9. As shown in Figs. 3, 4 and 9, the web A runs over the roller 32 and causes the latter to rotate in the liquid, thereby effecting the application of the liquid or glue in the tank 23 to the lower or under surface of the web A. To insure contact of the web A with the roller 32 and sufficient frictional engagement therewith to effect its rotation as well as engagement with the roller 32 over a relatively wide portion thereof to secure efficient and proper coating of the glue on the lower surface of the web, I provide a pair of pressure rolls 33 extending longitudinally of the roller 32 and throughout the length of the web A and arranged to engage with the roller 32 or to cause engagement of the web A therewith at points disposed at opposite sides of a vertical plane cutting the axis of the roller 32 and throughout that portion of the roller 32 between these points of contact or engagement. The rolls 33 are loosely mounted at their opposite ends in plates 34 slidably fitting opposing walls 1$^{a'}$ of the frame members 1$^a$, as shown in Figs. 3, 4, and 5. As will be understood, the rolls 33 and their supporting plates 34 are free to gravitate downwardly and thus effect pressure, due to their weight, upon the web A as it runs over the roller 32. 35 indicates a pair of levers pivotally connected at 35$^a$ to the plates 34 and serving as a means for raising and lowering the rolls 33 and their supporting plates 34. The levers are connected together for simultaneous operation, preferably by a bar 36 extending along the front of the machine (see Fig. 2) for a purpose which will later appear. The levers 35 are of arcuate shape and engage a pair of rollers 37 loosely mounted on stud shafts 37$^a$. The rollers 37 serve as combined fulcrums and guides for the levers 35 and permit them to swing outwardly and inwardly as the plates are raised and lowered, thereby compensating for the rectilinear movement of the plates 34 between their guides.

I prefer to positively drive the roller 32, and to effect relative movement between it and the web A, either at a faster or slower rate of speed relative to the rate of movement of the web A, due to the winding thereof on the mandrel 3 as the web is drawn from its source of supply, indicated at 38, so that the roller 32 may have a wiping action on the web, this being particularly desirable where the surface of the web to be coated is corrugated, as herein shown, in order that an adequate amount of the glue or other liquid may be applied to the corrugated surface of the web A. In carrying out this function of the machine, I secure to the shaft 11 a belt pulley 39 for a belt 40. The belt 40 runs around a pulley 40$^a$ fixed to the extended end of the shaft 32$^a$ for the roller 32. The pulley 40$^a$ being slightly larger than the pulley 39, it drives the roller 32 at a rate slower than the rate of speed of the mandrel 3 and hence at a speed slower than the rate of movement of the web A as it runs over the roller 32.

The source of supply 38 for the composite web A comprises a roll of the material mounted on a shaft 42 between end plates or discs 43. The shaft 42 is loosely and removably mounted in bearings 44 provided in brackets 44ª carried by the frame member 1ᶜ extending upwardly from the frame member 1ª. The opposite ends of the shaft 42 carry adjustable collars 45 engaging the outer end walls of the bearings 44 to prevent endwise movement of the shaft.

46 indicates a means for tensioning the web A so as to retard its movement to the mandrel 3, whereby the web is uniformly fed to and through the coating means 22 and to the mandrel. The tensioning means preferably comprises a freely rotatable roll 47 having its shaft mounted relatively stationary in suitable bearings 47ª on the frame members 1ª (see Fig. 3) and a roll 48 yieldingly pressed or operated toward the roll 47 and cooperating therewith to guide the web A between them. The shaft 48ª of the roll 48 is rotatably mounted in and supported by a pair of arms 49 pivoted on the frame members 1ª. The arms 49 are connected to springs 50, which tend normally to swing them in one direction, that is, upwardly, and thus yieldingly press the web A against the roll 47 as it passes between the rolls 47, 48. The lower ends of the springs 50 are preferably connected to eye-bolts 51 threaded into openings formed in the arms 49, such bolts permitting the springs to be adjusted to increase or decrease their tension. The upper ends of the springs are connected to levers 52 at one side of the pivots 52ª therefor, thereby holding the levers against stops 53 on the frame members 1ᶜ. To release the springs 50 and to lower the roller 48, when it is necessary to position the web A between the rollers 47 and 48, the levers 52 are operated about their pivots 52ª away from the stops 53, which operation moves the ends of the springs 50 to the opposite sides of the pivots 52ª so that the springs become ineffective and permit the arms 49 to be lowered so as to move the roller 48 away from the roller 47.

As shown in Fig. 3, the glue applying means and the tensioning means 46 are disposed in a plane below the mandrel 3, so that the feed of the stock or composite web A may be from below and upwardly to the mandrel and the glue is prevented from falling on the latter and the driving means therefor.

54 indicates a supply means for a covering of suitable sheet material C adapted to be wrapped around that portion of the web A wound on the mandrel 3. The covering material C preferably comprises sheet asbestos and such material may have a width equal to the length of the casing or jacket B wound on the mandrel 3. The supply roll 54 for the sheet material C is preferably arranged between but above the mandrel 3 and composite web supply 38, such arrangement permitting the sheet material C to be carried down behind the mandrel 3 and fed upwardly around its front portion in convenient reach of the operative. This arrangement also permits the covering C to be wrapped around the material A convolutely wound on the mandrel 3 without stopping or changing the direction of rotation of the latter. The roll 54 is mounted on a shaft 54ª loosely and removably mounted in suitable bearings 54ᵇ provided in brackets 54ᶜ secured to the upper portions of the frame members 1ᶜ. The opposite ends of the shaft 54ª are provided with adjustable collars 54ᵈ which engage the outer sides of the bearings to prevent endwise movement of the shaft 54ª. For the purpose of supporting and guiding the sheet material C, I provide a supporting plate or shield 55, the lower portion of which is carried around the lower portion of the mandrel 3 but in spaced relation thereto as shown in Fig. 4. The plate 55 may be supported on the frame 1 in any desired manner, but by preference it is secured at its upper edge to a transversely arranged bar 56, which in turn is supported on but in spaced relation to the members 1ᶜ by a pair of brackets 57. The upper edge of the plate 55 forms a straight-edge or guide, whereby, by means of a suitable tool—such as a saw—the material C may be cut transversely from side edge to side edge to sever the portion to be wrapped around that portion of the web A convolutely wound on the mandrel 3.

In making a casing or jacket B, I proceed as follows: First I connect the free edge of the web A to the mandrel 3; next, I operate the pedal 17 downwardly to throw in the clutch 15, thereby rotating the mandrel 3, and thus causing the web A to wind on the latter. I hold the pedal 17 downwardly and continue rotating the mandrel 3 until the desired number of convolutions or plies of the web A have been wound thereon and then I release the pedal 17 to stop such rotation and winding action, preferably stopping the mandrel 3 with the clamping means 18 opposite the point where the web A engages the mandrel or the previously applied convolution of material, as it leads from the roll 33, to insure uniform thickness of the resulting casing wall circumferentially.

In carrying out the winding step of my process, glue is applied to the corrugated surface of the web A and after being thus provided with glue, the web winds on the mandrel so that its opposite face or surface becomes connected to the previously applied convolution throughout its entire area. Next, I sever the web A transversely from side edge to side edge by means of a suitable tool, such as a saw, being guided in such operation by the bar 36. The severed portion of the web A is then pressed against the previously wound portion, or (and by preference) the mandrel is again set in operation to allow this severed portion to position itself on the wound material. The free edge of the web A is drawn forwardly slightly and laid over the bar 36 by which it is supported until the operative is ready to attach it to the mandrel 3 to start the winding of the next casing. Next, the free edge of the sheet material C is raised and pressed against the convolutely wound material. Next, the mandrel 3 is rotated to wrap the material thereon, preferably one revolution; then the material C is severed transversely and the wrapping of the severed edge on the material A is completed. Next, the clamping member 19 is operated to release the inner edge of the material or web A, and finally the mandrel 3 is swung to the position shown in dotted lines in Fig. 2 and the casing or jacket slid endwise relative to the mandrel to remove it. As already set forth, the glue is applied to the lower surface of the web A, so that the outer surface of the web on the mandrel carries the glue. As a result the covering C when wrapped on the wound material becomes connected thereto in an intimate and permanent manner circumferentially and from end to end.

In practice, in carrying out the steps incident to the application of the cover material C, I draw the free edge of the material upwardly and press it against the wound web A to cause the edge to adhere thereto and rotate the mandrel far enough so that by cutting the material C along a transverse line substantially coinciding with the upper edge of the shield 55, the severed section will extend once around the wound material A with its opposite edges in substantially abutting relation; the operative will become experienced so that very little overlap, if any, of the edges will occur. When the material C is severed as just described, the free edge of the material C is drawn downwardly and allowed to rest on the shield 55 ready for use in making the next cover section.

When it is desired to make casings or jackets B having a length greater than the width of the web A I may supply one or more additional webs in edge to edge relation to each other and the web A and wind all of them simultaneously on the mandrel 3. In the construction herein illustrated I have shown the machine as adapted to make casings from two composite webs A.

The webs A may be of equal width but preferably one is wider than the other, in which event waste and unnecessary labor is avoided.

The separate web A is furnished or supplied in roll form, such roll being mounted on a shaft 58 rotatably and removably mounted in suitable bearings 59 provided on the frame members 2. The bearings 59 are guided in ways 60, and adjusted therealong by screws 61. 62 indicates collars adjustably fixed to the shaft 58 and engaging the outer sides of the bearings to prevent endwise movement of the shaft 58. The roll for the separate web A is mounted rearwardly of the web supply 38, to permit of ready access to it as well as the feeding of the web direct to the tensioning means 46, and then to the liquid applying means 22. This arrangement permits both webs to be supplied together and fed to the mandrel 3 in edge to edge relation and permits their free ends to be secured to the mandrel in a simple manner and the latter operated without danger of distortion or unevenness.

D indicates a binding strip arranged to wind on the mandrel 3 simultaneously with the webs A and to overlap the joint therebetween whereby the webs are held together and the joint reinforced. The free end of the binding strip D is preferably secured to the mandrel 3 by the clamping means 18 simultaneously with the free ends of the webs A, so that the rotation of the mandrel will effect the application of the binding strip and the latter will be co-extensive with the lengths of the webs A wound on the mandrel. The binding strip D may be formed from any suitable material, but I preferably use sheet asbestos cut to the desired width. The strip may be of any desired width. As the glue is applied to the lower surface of the webs A, it will be seen that the strip D becomes permanently secured to the edge portions of the webs A as winding takes place.

The binding strip D is supplied from a roll 63 mounted on a shaft 64. The shaft 64 is supported at its opposite ends in bearings 65 carried by an auxiliary frame 66. The frame 66 preferably comprises a pair of arms 67 pivoted to and slidably mounted on a rod 68, which is supported at its ends in the frame members 1ª, and legs 67ª pivoted at their upper ends to the outer portions of the arms 67 and engaging the floor at their lower ends. The arms 67 and legs 67ª may be braced and detachably connected by a pair of links 67'. The arms 67 are spaced on the rod 68 by a sleeve 69 and adjustably positioned on the rod by collars 70, which are fixed thereto by set screws 71. This form of construction permits the frame 66 and roll 63 carried thereby to be adjusted relative to the mandrel 3, to align the strip D with the joint between the webs A. Where more than two webs A are required to make a casing or jacket B, additional supply means for the webs A may be provided and also additional supply means to feed a strip D for each joint therebetween.

When the casing or jacket is made from a single web A, the links 67' may be detached from the legs 67ª, the latter (which are pivoted to the arms 67) folded inwardly and the arms 67 folded downwardly about the rod 68.

In carrying out my process of making casings or jackets from a plurality of webs, the latter and the binding strip are connected to the mandrel and wound simultaneously thereon as above described. This not only simplifies the process but insures the connection of the webs throughout their lengths as well as provides for their reinforcement at the joint since each convolution is wound in close engagement with the previous convolution.

In constructing the machine, the mandrel, the liquid applying means and the tensioning means have a length equal to or greater than the maximum size casing or jacket to be made, so that any other size or length thereof less than the maximum may be made without changing these parts.

From the foregoing description it will be seen that my improved machine is relatively simple and that the same may be operated in a ready and rapid manner by a single operative. By supplying the web or webs A from source of supply of indefinite length and feeding it or them to a mandrel that is rotated, a casing or jacket of any desired number of convolutions, to build up a wall of predetermined thickness, is rapidly made to meet any desired conditions. Furthermore, by using a composite web comprising sheet and corrugated materials fed in an intimate, unitary relation, the walls of the resulting product are of cellular form in cross section.

In feeding the web or webs A I prefer to supply them with the corrugated material $a'$ on their lower surfaces. This permits the sheet material $a$ to lie against the mandrel, thereby forming a smooth, continuous or unbroken surface on the inner wall of the completed casing and by applying the liquid or glue to the corrugated surfaces of the webs and finally wrapping a section of material C around the last convolution of the web or webs, all of the glued surfaces are enclosed and the exposed surfaces (the inner and outer surfaces of the casing) are left dry.

Furthermore, by using composite material of the construction herein disclosed and winding it on the mandrel, the sheet material $a$ closes the spaces formed longitudinally of the corrugations of the material $a'$ to make the cells complete from end to end, which cells constitute dead air spaces to prevent heat conduction. As all of the material entering into the structure of the casing is formed of asbestos, the casing not only prevents temperature changes by radiation due to internal or external heat, but makes the body enclosed by it fire proof.

To those skilled in the art to which my invention relates many changes and alterations therein and widely differing embodiments and applications of the invention will suggest themselves without departing from the spirit and scope thereof. My descriptions and the disclosure herein are purely illustrative and are not intended to be in any sense limiting.

What I claim is:

1. The herein disclosed process which consists in supplying a plurality of cellular webs in edge to edge relation and a binding strip in overlapping relationship to the abutting edges thereof and connecting the free edges of the webs to a mandrel, applying liquid to corresponding surfaces of the webs and rotating the mandrel to wind the webs and strip thereon.

2. The herein disclosed process which consists in supplying a plurality of cellular webs in edge to edge relation and a binding strip in overlapping relationship to the abutting edges thereof and connecting the free edges of the webs to a mandrel, applying liquid to corresponding surfaces of the webs, rotating the mandrel to wind the webs and strip thereon, and finally applying a cover to the wound webs and strip.

3. The herein disclosed process which consists in supplying a plurality of cellular webs in edge to edge relation and a binding strip in overlapping relationship to the abutting edges thereof and connecting the free edges of the webs to a mandrel, applying an adhesive to those surfaces of the webs that are exposed as each convolution is wound on the mandrel, and finally applying a cover to the outer surfaces of the last convolution.

4. The herein disclosed process which consists in supplying a plurality of composite webs in edge to edge relation, each comprising sheet material and corrugated material on one surface thereof and supplying a binding strip in overlapping relation to the abutting edges of the web, connecting the free edges of the webs to a mandrel, applying an adhesive to the crowned portions of the corrugations as the webs move to the mandrel, rotating the mandrel to convolutely wind the webs thereon and to connect the convolutions together to form a composite cellular wall, and finally covering the convolutely wound wall with a section of material.

5. The herein disclosed process which consists in simultaneously supplying flexible, fire-resisting, composite webs in edge to edge relation and a binding strip of fire-resisting material, applying adhesive material to a former, to corresponding surfaces of the webs and rotating the former to wind the webs thereon.

6. The herein disclosed process which consists in simultaneously supplying a plurality of flexible, fire-resisting, cellular webs in edge to edge relation and a fire-resisting strip to a mandrel, winding the webs and strip convolutely on the mandrel, and finally supplying and wrapping around the wound webs and strip further fire-resisting material to form a cover therefor.

7. A casing or jacket for enclosing fluid containers or conduits comprising convolutely wound composite webs in edge to edge relation, each web consisting of alternate layers of sheet material, and corrugated material and a strip convolutely wound with said webs in overlapping relation to the joint between their adjoining edges, the said strip being connected to the surfaces of the webs throughout its length.

8. A casing or jacket as claimed in claim 7 in which the convolutely wound wall is wrapped with a sheet of fire-resisting material.

In testimony whereof, I have hereunto subscribed my name.

SIMON J. LONERGAN.